April 25, 1961   W. ANGER, JR   2,981,022
SPECTACLE FRAMES
Filed Oct. 20, 1958

INVENTOR.
WILHELM ANGER JR.
BY

United States Patent Office 2,981,022
Patented Apr. 25, 1961

2,981,022
SPECTACLE FRAMES
Wilhelm Anger, Jr., Traun, Austria
Filed Oct. 20, 1958, Ser. No. 768,105
1 Claim. (Cl. 41—30)

This invention relates to spectacle frames.

One of the objects of the invention is a spectacle frame made of relatively high temperature polymerizing thermoplastic such as nitrocellulose or acetate cellulose having recesses machined or formed into its outer surfaces exposed to view and containing decorative bodies such as stones, metal parts, or the like, which are held in position "floating" by a substantially low temperature polymerizing thermoplastic filling out these recesses substantially flush with the outer surface and thereby giving these decorations a plastic show-window like appearance.

Another object of the invention is to permit these recesses to extend throughout the celluloid sheet and fill out the openings thus made with decorative bodies positioned by the low temperature plastic flush with at least the front surface of the Celluloid sheet forming the frame.

Still another object of the invention is to make the Celluloid sheet forming the spectacle frame at least on its rear side or on the bottom of the recesses relatively less transparent, translucent or semi-transparent to increase the plastic effect of the decorative bodies suspended in the more transparent low temperature plastic forming a glasslike window through which these parts are exposed to view without being subjected to dirt or wear.

Still another object of the invention is to provide on top of the surface of the cellulose frame sheet and the low temperature thermoplastic filling holding in place the decorative bodies in the recesses provided therefor, an additional relatively thin high temperature polymerizing plastic sheet or layer, preferably made of the same material as the frame to protect the low temperature plastic filling without affecting the view from the outside.

More specifically, this cover sheet is relatively transparent at the points or surface exposing the decorative bodies to view and less transparent, translucent, or semi-transparent at the surrounding points or surface where it is attached to the frame.

These and other objects of the invention will be more fully apparent from the drawing annexed herewith in which Fig. 1 represents a front view of a spectacle frame according to the invention.

Figure 1:
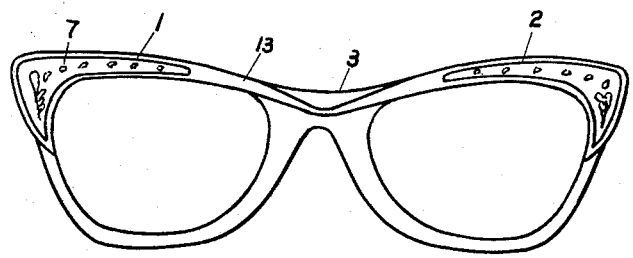
Figure 3:
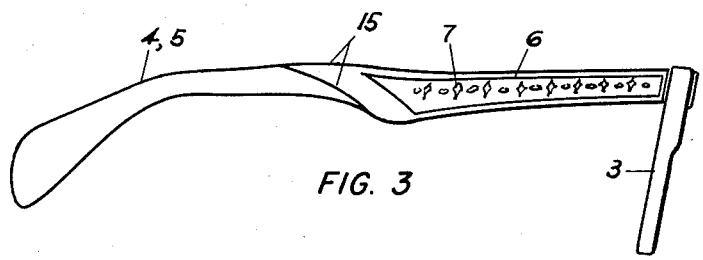

In Fig. 1 the recesses holding the decorative articles have the outlines indicated at 1 and 2 on the glass holding portion or lens frame 3 of a spectacle frame while Fig. 3 shows recesses applied to temple or side straps 4 and 5 at the outside thereof and in the form indicated in Fig. 3 by outline 6.

Figure 4:
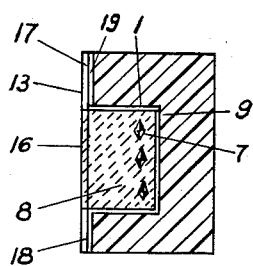
Fig. 4 represents a cross section along lines 4—4 of Fig. 2 at an enlarged scale in front elevation.

In the cross section of Fig. 4 one of recesses 1, 2 is indicated at 1, milled or otherwise formed into the high temperature polymerizing plastic sheet of lens frame 3 preferably made of nitrocellulose.

Figure 2:
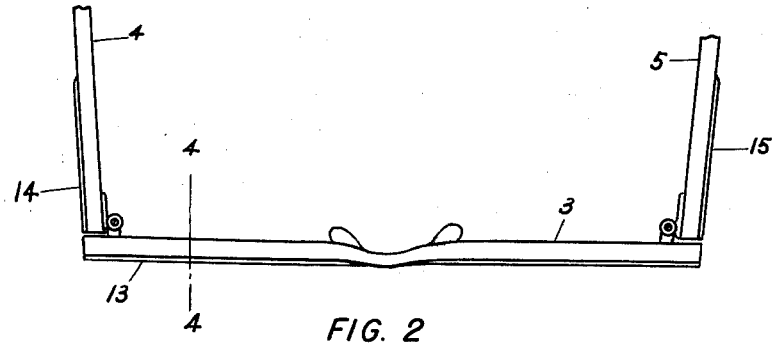
Figs. 2 and 3 show corresponding top and side views, respectively.

Recesses 1, 2, and 6 contain decorative bodies such as stones and brass parts schematically indicated in Figs. 1, 2, 3 at 7 floating or suspended in a substantially transparent low temperature polymerizing plastic such as indicated in the cross section of Fig. 4 at 8.

In order to make decorative bodies 7 more clearly visible and especially to emphasize their three-dimensional character, the bottom of recesses 1, 2, and 6 is coated or otherwise provided or impregnated with a dye or layer schematically indicated in Fig. 4 at 9 which is less transparent or translucent as compared to transparent filling 8 of recesses 1, 2, and 6.

Low temperature plastic 8 is so selected as to permit its insertion into the corresponding recesses at room temperature without substantially affecting the structure of the relatively high temperature thermoplastic base material or sheet such as nitrocellulose.

A preferred low temperature polymerizing plastic used according to the invention and especially cooperating with a nitrocellulose back sheet is monostyrol with benzyl peroxide as accelerator. Alternatively, a methacrylate derivative can be used.

Figure 5:
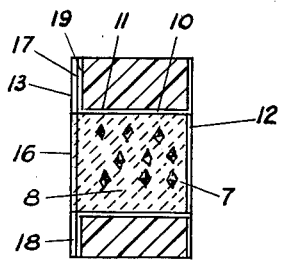
Fig. 5 represents a modification of Fig. 4.

The modification of Fig. 5 corresponds in substance to the representation of Fig. 4 except that recesses of the type indicated in Figs. 1, 2, 3, and 4 at 1, 2, and 6 are shown to pierce, or extend through, the entire sheet 3 of the spectacle frame, and in this case the low temperature polymerizing plastic 8 is indicated to fill these entire openings, holding suspended therein decorative bodies such as indicated at 7.

These through-openings or holes also machined or formed in the frame material or sheet 3 are indicated in the cross section of Fig. 5 at 10.

In this case in order to enhance the three-dimensional effect not only are the walls of openings 10 coated with a less transparent or translucent dye or impregnation schematically indicated in Fig. 5 at 11 but also the side of the low temperature plastic layer 8 not exposed to view is provided with a dye layer or impregnation of less transparency such as indicated at 12 to make the decorative body 7 as seen from the front of the spectacle frame more plastically visible.

In further modification of the invention, as also apparent from Figs. 1 to 5, protection is provided for the low temperature plastic polymerizing fill-in of the recesses by attaching a cover sheet or shield on top of the base layer or sheet forming the spectacle frame, preferably also consisting of high temperature polymerizing plastic such as nitrocellulose as schematically indicated in Fig. 4 at 13 and in Fig. 5 where it is shown to be attached to the front of sheet 3. In this case, it may of course be attached to both sides of sheet 3.

The corresponding shields for lens frame and temple straps are decoratively shaped substantially corresponding to the shape of lens frame 3 and have the outlines schematically shown at 13 in Fig. 1, and for the temple straps the form shown at 14, 15 in Figs. 2 and 3.

As apparent from Figs. 4 and 5, the portions of shields 13, 14 and 15 exposing the inside of recesses 9 to view are relatively transparent as schematically indicated at 16 while the side portions schematically indicated in Figs. 4 and 5 at 17 and 18 are relatively translucent provided for example with a white backing schematically indicated in Figs. 4 and 5 at 19 while the remainder of these side portions are semitransparent, for example, colored upon the spectacle frame sheet 3.

The invention is not limited to the particular form of the recesses shown nor to the arrangement nor to the type and shape of decorative parts shown or described nor to the form of the frame itself or its parts but may be applied in any way or manner whatsoever without departing from the scope of this invention.

I claim:

A spectacle frame of substantially high temperature polymerizing base material having recesses in at least some of its front portions, decorative parts arranged in said recesses, said recesses having walls following substantially the contours of said portions and being substantially larger than said decorative parts so as to permit said parts to be arranged in said recesses spaced from said walls, a filling holding said parts suspended of low temperature polymerizing substantially transparent material arranged substantially flush with said front portions, a protective sheeting on top of said recesses of a thickness which is small compared to the thickness of the frame, and which is relatively transparent at the points of the recesses, and less transparent at the points surrounding said recesses where it is attached to said frame, said protective sheeting being coated on its bottom with a substantially translucent layer and is semitransparent throughout the rest of the layer at the portions surrounding said recesses, and said sheeting at the portions covering the recesses being substantially transparent.

References Cited in the file of this patent

UNITED STATES PATENTS

| | | |
|---|---|---|
| 1,778,726 | Pappert | Oct. 21, 1930 |
| 2,306,939 | Ferris | Dec. 29, 1942 |
| 2,842,028 | Belgard | July 8, 1958 |

FOREIGN PATENTS

| | | |
|---|---|---|
| 1,081,963 | France | Dec. 24, 1954 |

OTHER REFERENCES

"Acrylics for Patterned Laminates," September 1947 issue of Plastics, page 21.

"Iridescence Built Into Plastics," Modern Plastics, January 1951, pages 71–73.

"Embedding in Acrylics" by A. J. Spilner, Modern Plastics, November 1953, vol. 31, No. 3, pages 129, 130, 132, 133, 134, 136.